United States Patent

[11] 3,609,493

[72] Inventor Rodney G. Rakes
    Bristol, Tenn.
[21] Appl. No. 87,212
[22] Filed Nov. 5, 1970
[45] Patented Sept. 28, 1971
[73] Assignee Sperry Rand Corporation

[54] OPTICALLY COMMUTATED BRUSHLESS DC MOTOR HAVING CONTROLLED LIGHT SOURCE
    6 Claims, 2 Drawing Figs.
[52] U.S. Cl. .................................................. 318/254, 318/439, 318/430
[51] Int. Cl. ...................................................... H02k 29/00
[50] Field of Search ........................................... 318/254, 138, 696, 685, 439, 640

[56] References Cited
    UNITED STATES PATENTS
3,453,514 7/1969 Rakes et al. ................. 318/254
3,412,303 11/1968 Rakes ........................... 318/254

Primary Examiner—G. R. Simmons
Attorney—S. C. Yeaton

ABSTRACT: An optically commutated brushless DC motor includes a voltage divider in series with the commutator light source and a tapped resistor in series with the stator windings of the motor. The resistor provides a voltage drop proportional to the motor drive current. Transistor circuits are actuated in response to the voltages appearing across the resistor and arranged to provide a shunt path around a portion of the voltage divider when the motor current becomes either abnormally high or low. With a portion of the voltage divider thus shunted, the output of the light source is intensified. The increased intensity prevents underlap so as to provide extra drive during starting or stall conditions.

PATENTED SEP 28 1971  3,609,493

INVENTOR
RODNEY G. RAKES
BY
*Joseph M. Rashid*
ATTORNEY

3,609,493

OPTICALLY COMMUTATED BRUSHLESS DC MOTOR HAVING CONTROLLED LIGHT SOURCE

BACKGROUND OF THE INVENTION

1. Field of the Invention

The invention relates to brushless DC motors and more specifically to optically commutated brushless DC motors.

2. Description of the Prior Art

Optically commutated brushless DC motors (BDCM'S) are well known in the art. In such motors, light from a source is modulated in response to rotation of the rotor. The modulation of the light is detected by an optical sensor and used to switch an energizing current to appropriate stator windings so as to maintain rotation of the rotor. At the switchover points, however, a dead zone may occur so that if the rotor happens to come to rest at or near a switchover point, the motor may not start when energizing current is reapplied. Furthermore, if an abnormally high mechanical load is applied, such prior art motors may stall at a switchover point.

The circuit of the present invention detects dead zones and operates to increase the rotor torque.

SUMMARY OF THE INVENTION

The starting and stall torque of an optically commutated BDCM is increased according to the principles of the present invention by providing a circuit that detects dead zones and automatically increases the light intensity of the light source in the commutator circuit so as to provide added torque until the motor is again operating normally.

BRIEF DESCRIPTION OF THE INVENTION

FIG. 1 is a schematic diagram, partly in perspective, illustrating one type of BDCM that may utilize the principles of the invention; and FIG. 2 is a circuit diagram illustrating a presently preferred embodiment of the invention.

DESCRIPTION OF THE PREFERRED EMBODIMENT

Figure 1:
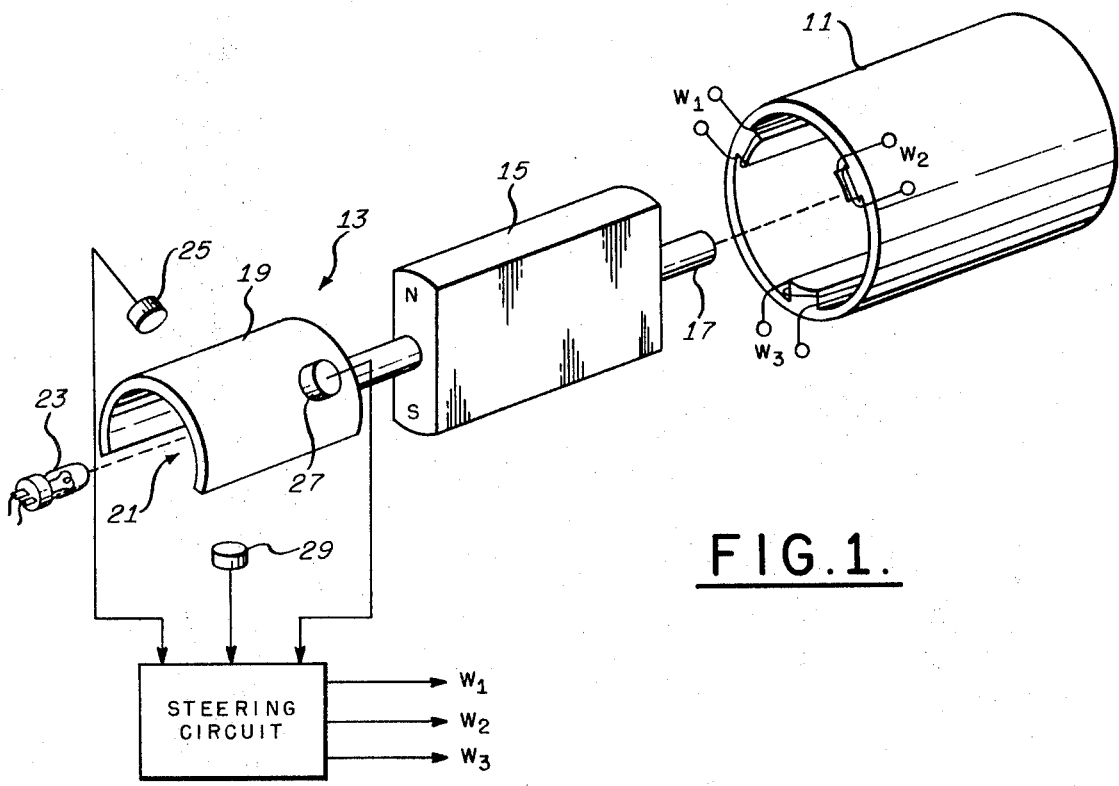

Referring now to FIG. 1, a typical motor housing ll contains stator windings $W_1$, $W_2$ and $W_3$. A commutating means 13 is actuated in response to rotation of a permanent magnet rotor 15 mounted on a shaft 17. The rotor 15 is energized along a diameter thus producing north and south poles which are attracted to the various stator windings so as to cause rotation of the rotor. A light shield 19 contains an axial slot or aperture 21. A light source 23 such as an incandescent lamp or a light emitting diode is mounted within the light shield 19 so as to produce a beam of light which rotates in accordance with the rotation of the rotor and successively illuminates the photocells 25, 27 and 29. Thus the light beam is effectively modulated so as to actuate a steering circuit and thereby energize the stator windings $W_1$, $W_2$ and $W_3$.

The aperture 21 is normally made sufficiently wide so that when the aperture is intermediate a pair of photocells, the edges of the light beam illuminate the adjacent photocells so as to provide a certain overlap. In this way, the motor normally may be started even though the aperture happens to come to rest between a pair of photocells.

The motor, when operating at its rated speed and load conditions, draws a normal running current that remains within a relatively narrow specified range of values.

However, degradation of switching or optical components may effectively cause an underlap. Thus a decrease in light intensity reaching the photocells or a decrease in sensitivity of the photocells may reduce the switching signals to an ineffective level. Similarly, even though normal switching signals are produced, the steering circuit components may deteriorate to a point where they cannot respond to the normal switching signals.

On the other hand, if an abnormally high mechanical load is applied to the motor, the stator winding current will increase. If the load is sufficiently large, however, even the resulting high "stall" current may not be large enough to maintain rotation.

Figure 2:
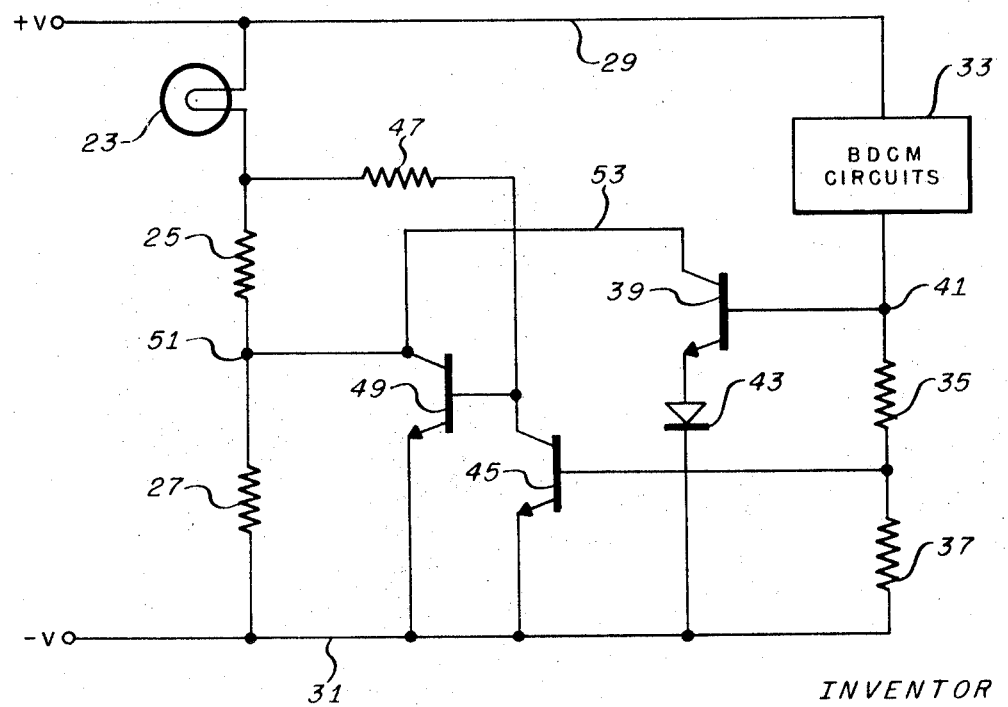

These problems may be overcome by means of the circuit of FIG. 2 in which a light source 23 is energized through a pair of resistors 25 and 27 forming a voltage divider. The light source and the voltage divider are connected in series relationship across a pair of busses 29 and 31 which are adapted to receive current from a suitable external source. The motor circuits, illustrated schematically as BDCM circuits 33, are energized through a resistor means including the resistor 35 and the resistor 37. A first switching means comprising a transistor 38 is actuated in response to a voltage appearing at a point 41. The emitter of the transistor 39 is connected to the negative buss 31 through a diode 43. An inverter transistor 45 receives a base signal from the junction point between the resistors 35 and 37. The inverter transistor 45 has its emitter connected directly to the negative buss 31. The collector of the transistor 45 is coupled to the lamp circuit through a resistor 47. The collector voltage of the transistor 45 is applied to the base of an output transistor 49. The emitter of the output transistor 49 is connected directly to the negative buss 31. The collector of the transistor 49 is connected to a junction point 51 between the resistors 25 and 27. The collector of the transistor 49 is also coupled to the collector of the transistor 39 through a lead 53.

When the motor is operating at its normal running speed, a voltage is developed across the resistors 35 and 37 which permits the transistor 45 to conduct. The diode 43 in series with the transistor 39, however, prohibits the transistor 39 from conducting. Conduction of collector current by the transistor 45 reduces the collector voltage on this transistor to a level which prohibits conduction in the transistor 49. Since both transistor 39 and transistor 49 are nonconducting under these normal operating conditions, current to the lamp 23 must flow through the voltage divider. Under these conditions, the lamp operates at its normal brilliance. If the current supplied to the stator windings reaches an abnormally high level, however, the voltage drop across the resistors 35 and 37 increases accordingly. The transistor 39 is thereby driven into conduction, thus shunting current around the resistor 27 and increasing the current applied to lamp 23. Under these conditions the lamp 23 increases in brilliance so as to increase the conductivity of any of the photocells which may be illuminated at that time. This, in turn, increases the stator winding current. The resulting increase in torque helps to overcome a heavier-than-normal load which may be experienced.

Thus, the transistor 39 acts as a high current detector under these conditions.

If the stator winding current being applied to the motor falls below the normal operating range, the inverter transistor 45 ceases to conduct thus permitting the output transistor 49 to become conductive. Conduction of the current through the transistor 49 provides an additional shunt path around the portion of the voltage divider including the resistor 27 so as to again increase the intensity of the light produced by the lamp 23. Thus, the transistor 49 and the transistor 45 cooperate to act as a second switching means that detects abnormally low stator winding currents. Such currents occur, for instance, when an underlap is experienced. The resulting increase in light intensity effectively overcomes such an underlap and permits the motor to start and operate normally.

The resistors 35 and 37 cooperate to act as a monitoring means responsive to the level of stator winding current.

If desired, the voltage at the junction point 51 may be utilized to provide information as to motor condition. If the voltage at the junction point 51 remains proportional to the ratio of the resistance of the components in the voltage divider network, the motor may then be assumed to be operating at its normal current level. If the voltage at the junction point 51 falls to a level near zero, saturation of the transistor 49 is indicated and the stator winding current is too low to turn the transistor 45 on.

Although the invention has been described with respect to the particular motor schematically illustrated in FIG. 1, it will be appreciated by those skilled in the art that the principles of the invention may be applied to a wide variety of BDCM's. U.S. Pat. No. 3,364,407; No. 3,377,534 and No. 3,386,019 issued to Roy K. Hill and assigned to the present assignee, for instance, describe various motors that may utilize the principles of the present invention.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An improved optically commutated BDCM of the type including a permanent magnet rotor arranged to rotate in response to stator winding current supplied from an external DC source, said current having a specified range of values when the motor is operating in its normal running condition, said motor further including a light source, means to modulate light from said source in response to rotation of said rotor, and means to switch said stator winding currents in response to said modulations, said improvement comprising means to monitor the level of said stator winding current and means responsive to said monitoring means for increasing the intensity of light from said source whenever said stator winding current falls outside said specified range of values.

2. The improved BDCM of claim 1 wherein said light source is an electrically energized lamp and said means for increasing the intensity of light from said source includes means to increase the current through said lamp.

3. The improved BDCM of claim 2 wherein said means to increase the current through said lamp is a voltage divider actuated in response to said monitoring means.

4. The improved BDCM of claim 3 wherein said monitoring means includes resistor means arranged to provide a voltage proportional to said stator winding current and said means responsive to said monitoring means includes first and second switching means responsive to voltages developed across said resistor means, said first and second switching means being adjusted to close when said stator winding current reaches a value above and below said range of values respectively.

5. The improved BDCM of claim 4 wherein each of said switching means is arranged to short out a portion of said voltage divider when that switching means is closed.

6. The improved BDCM of claim 5 wherein said first switching means includes a transistor having an input circuit connected to receive a signal from said resistor means and output circuit connected across a portion of said voltage divider, and wherein said second switching means includes an inverter transistor connected to receive input signals from said resistance means and an output transistor connected to short out a portion of said voltage divider when said inverter transistor is rendered nonconductive by a signal from said resistance means.